United States Patent

Rintala

[11] Patent Number: 5,605,275
[45] Date of Patent: Feb. 25, 1997

[54] APPARATUS FOR POSITIONING OF METAL SHEETS IN CONNECTION WITH WELDING

[75] Inventor: Martti Rintala, Olofström, Sweden

[73] Assignee: AB Volvo, Gothenburg, Sweden

[21] Appl. No.: 564,075

[22] PCT Filed: May 25, 1994

[86] PCT No.: PCT/SE94/00491

§ 371 Date: May 10, 1996

§ 102(e) Date: May 10, 1996

[87] PCT Pub. No.: WO94/29073

PCT Pub. Date: Dec. 22, 1994

[30] Foreign Application Priority Data

Jun. 11, 1993 [SE] Sweden .................. 9302008

[51] Int. Cl.$^6$ ........................... B23K 37/04
[52] U.S. Cl. ........................ 228/49.4; 228/5.7
[58] Field of Search ............... 228/212, 5.7, 49.3, 228/49.4; 219/101, 161, 603

[56] References Cited

U.S. PATENT DOCUMENTS

| | | | |
|---|---|---|---|
| 3,593,907 | 7/1971 | Hahne | 228/5.7 |
| 4,506,821 | 3/1985 | Bernou et al. | 228/5.7 |
| 4,721,241 | 1/1988 | Yuasa et al. | 228/5.7 |
| 5,536,915 | 7/1996 | Peru et al. | 228/49.4 |

*Primary Examiner*—Samuel M. Heinrich
*Attorney, Agent, or Firm*—Varnum, Riddering, Schmidt & Howlett LLP

[57] ABSTRACT

An apparatus for positionally aligning two metal sheets (4, 5) along a joint during welding has a table (2, 3) provided for each sheet (4, 5), and clamping jaws (7, 8) urgeable thereagainst. An abutment (6) is provided at the joint between the metal sheets (4, 5) and extends, in an active position, up over the tables (2, 3) so as to serve as an arrest on insertion of the sheets (4, 5). The abutment (6) is lowerable to a passive position. The tables (2, 3) are movable towards and away from one another in a relative advancement movement, and the clamping jaws (7, 8) are suspended in parallelogram guides (16, 17; 22, 23) so that they are movable towards and away from the tables (2, 3). At least the one parallelogram guide has an anchorage (14) in the frame (1) of the machine so that the associated clamping jaw (8) can accompany the advancement movement.

18 Claims, 3 Drawing Sheets

APPARATUS FOR POSITIONING OF METAL SHEETS IN CONNECTION WITH WELDING

TECHNICAL FIELD

The present invention relates to an apparatus for the positional fixing of two metal sheets which are to be welded together along a joint, and comprises a support member provided for each sheet, and clamping means which are urgeable against the metal sheets disposed on the support members.

BACKGROUND ART

Increasingly far-reaching demands are placed in the automotive industry on the possibility of employing rational welding processes to fuse together sheet metal parts which later constitute the blanks in a pressing process. By such means, considerable material waste is avoided in that the blank may be given a configuration which corresponds to that of the finished part.

Those blanks which are under consideration here may many times consist of sheet metal materials of different thicknesses, and the sheet material may have different types of surface coatings. In such instance, it is then important that the surface coatings are damaged as little as possible, and that the effects of heat on the material are also kept within very narrow limits.

The prior art technology employed for welding in similar or identical practical applications to the present one has previously been resistance welding using copper wheels as electrodes (seam welding). Such a method is relatively simple and economical but does not guarantee high and uniform quality, since an overlap joint must be employed.

Laser welding has also previously been tried in practical applications of the type under consideration here. This welding method results in superior quality because of welding in a butt joint. However, productivity is low and investment costs are so high that this method can only be employed in exceptional cases.

Attempts have also been made in the art employing welding processes in which the welding heat is generated by resistive heating of the workpiece by using high frequency alternating current. In one such a welding process, the welding joint is heated simultaneously along its entire length, for which reason the workpieces must be aligned and advanced towards one another during the welding phase proper.

PROBLEM STRUCTURE

The present invention has for its object to realises an apparatus of the type disclosed by way of introduction, the apparatus being designed so as to permit welding by the employment of induction heating of the workpieces so that these may be accurately aligned in relation to one another prior to the welding phase, and, during the-welding process proper, be advanced towards one another at a predetermined rate and predetermined advancement length. The present invention further has for its object to realise an apparatus which displays high output capacity, which allows for accurate alignment and positional fixing of the workpieces, at the same time as investment costs may be kept at a reasonable level.

SOLUTION

The objects forming the basis of the present invention will be attained if the apparatus intimated by way of introduction is characterized in that there is disposed, in a region where the joint between the metal sheets is to be located, between closely adjacent edges of the support members, an abutment which is movable between an active position where it extends up over the upper sides of the support members to serve as an arrest on insertion of the metal sheets, and a passive position where it is located beneath this level; that the support members are movable in a relative advancement movement towards and away from one another; that the clamping members are provided with movement devices by means of which they are guided in movements towards and away from the support members, substantially transversely directed in relation to their plane of extent; and that the movement devices are, in themselves or in their anchorages in a frame for the apparatus proper, disposed to permit the clamping members to accompany the support members in their relative advancement movements.

These distinguishing features afford the major advantage that the metal sheets may simply be brought to a halt against the abutment, whereby their relative mutual positions are fixed. After fixed clamping against the support members, the sheets will then accurately follow the advancement movement which the support members describe.

BRIEF DESCRIPTION OF THE ACCOMPANYING DRAWINGS

The present invention will now be described in greater detail hereinbelow, with particular reference to the accompanying drawings. In the accompanying drawings.

DESCRIPTION OF PREFERRED EMBODIMENT

Figure 1:
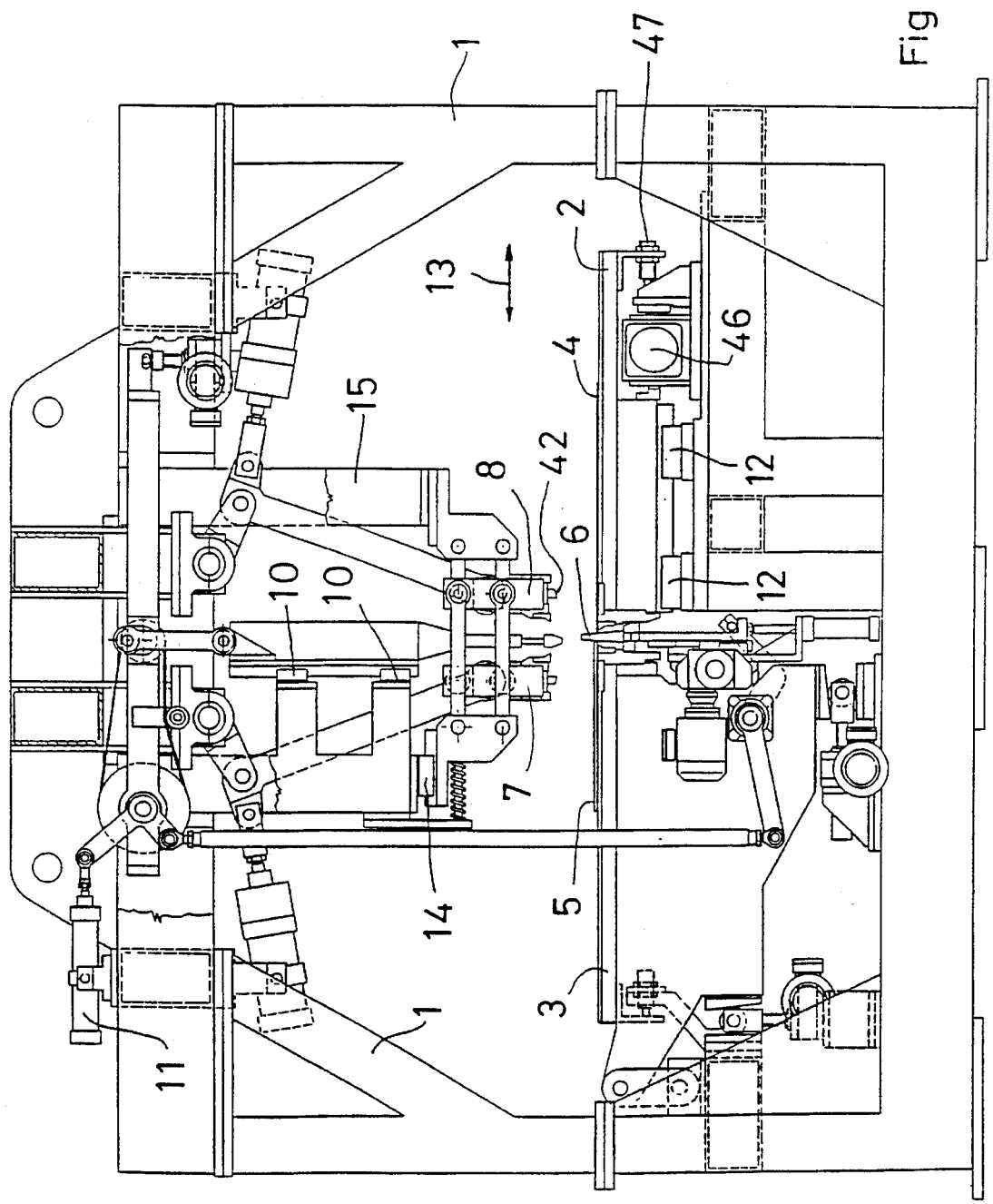
FIG. 1 is a vertical side elevation of the apparatus according to the invention.

In FIG. 1, reference numeral 1 relates to a frame for the subject matter of the present invention. In the frame, there are provided two support members 2, 3 designed as tables on which the metal sheets 4 and 5 are intended to rest. Between the mutually facing edges of the tables 2 and 3, there is provided a raisable and lowerable abutment 6 which, on insertion of the metal sheets 4 and 5, serves for positioning them.

Figure 2:
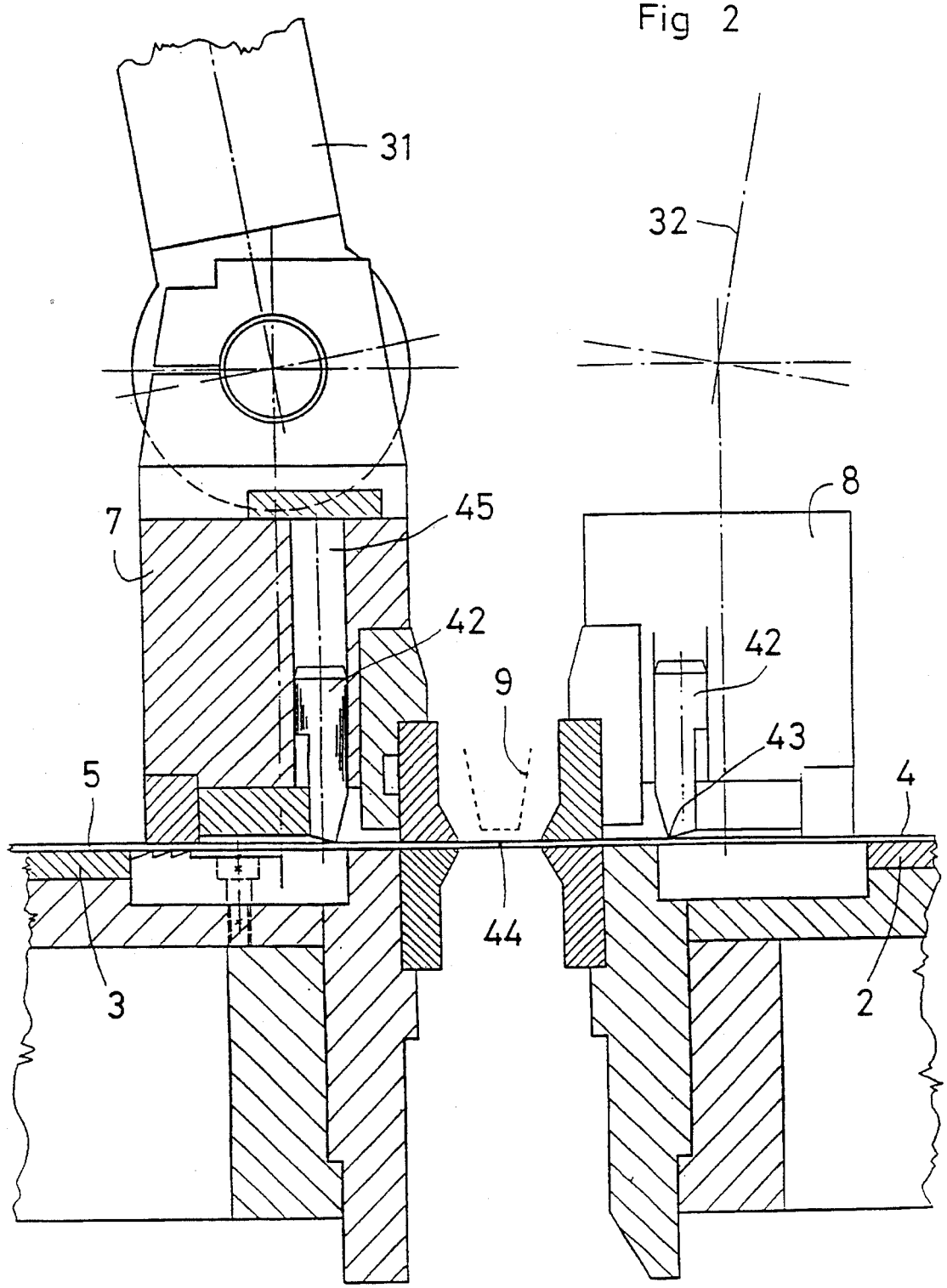
FIG. 2 is a vertical section through the apparatus in the region of the joint between the metal sheets.
Figure 3:
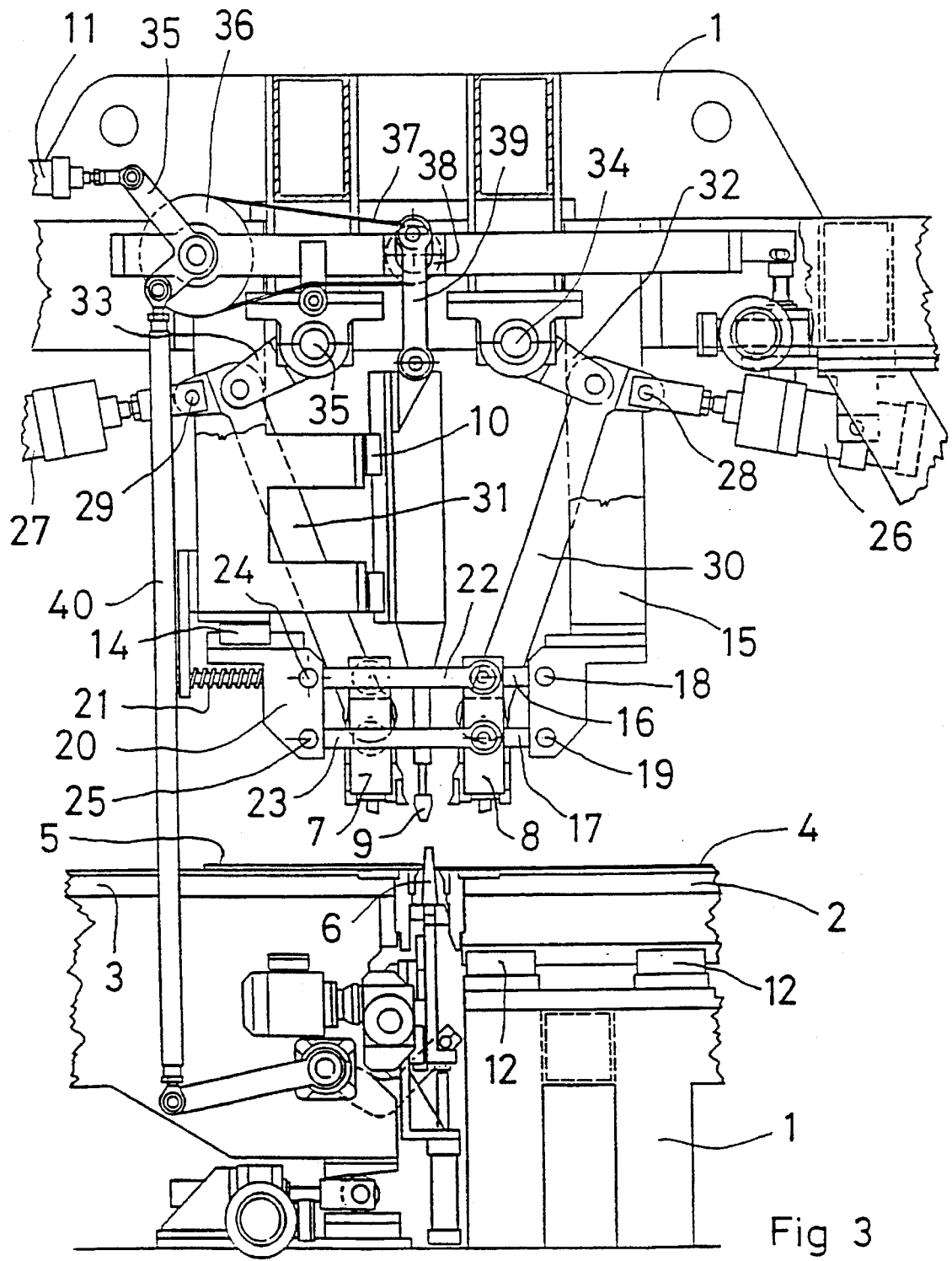
FIG. 3 is a partial view of FIG. 1, on a larger scale.

Against the upper faces of the metal sheets 4 and 5, and in the regions of the mutually facing edges of the tables 2 and 3, there are provided two clamping members 7 and 8 which are urgeable against the metal sheets from above, and which, in FIGS. 1 and 3, are shown in their upper, inactive positions, but which in FIG. 2 are shown in their lowered positions where they abut against the edge regions of the metal sheets 4 and 5 and urge these against the tables 2 and 3.

In order to illustrate that the subject matter of the present invention is usable both for metal sheets 4 and 5 of the same thickness, and for sheets of different thicknesses, FIG. 2 shows one instance of sheets of identical thickness, while in FIGS. 1 and 3 the sheet 5 (the left-hand sheet in the Figures) is shown as being thicker than the sheet 4.

For realising the weld between the two metal sheets 4 and 5, the apparatus according to the present invention includes a heating device 9 which extends throughout the entire length of a joint 44 (FIG. 2) between the sheets 4 and 5 and which is designed for induction heating of the sheets in the joint region. The heating device 9 is vertically movable towards and away from the sheets and is shown in FIGS. 1 and 3 in a raised, passive position a distance from the sheets. The heating device 9 has a sliding guide 10 for its vertical movements and is drivable under the action of a prime mover 11 which, in the illustrated embodiment, consists of a cylinder unit.

The prime mover 11 is mechanically connected to the abutment 6 so that this, at least on transfer from the active position illustrated in FIGS. 1 and 3 over the sheets 4 and 5 to the passive position beneath them, is movable under the action of the prime mover. It will hereby be ensured that the abutment 6 is always transferred to the passive position when the heating device has been lowered to its operative position immediately above the joint 44 between the sheets 4 and 5.

As has been mentioned previously, the heating device 9 is designed for induction heating of the joint region and includes a coil which is of a length to cover the entire joint region. Hereby, the heating device 9 realises simultaneous heating of the entire length of the joint between the sheets 4 and 5. On this heating, the material in the mutually facing edge portions of the sheets will be brought to such an elevated temperature that a weld joint occurs if the sheets are moved towards one another in a relative advancement movement. The size of this advancement movement may, of course, vary but lies within the range of a tenth of a millimeter or so, and up to a few tenths of a millimeter, possibly one or a couple of millimeters.

In the embodiment illustrated in FIG. 1, the table 3 may, concerning the advancement movement, be considered as fixed, which also applies to the clamping device 7 which is to fixedly clamp the sheet 5 against this table. On the other hand, the table 2 has a guide for displaceable support. The guide is suitably a sliding guide 12 in the frame 1 so that the table is reciprocal in accordance with the double-headed arrow 13 towards and away from the second table 3. Further, the clamping device 8, which cooperates with the movable table 2, is suspended in a guide (preferably a sliding guide 14), so that it can accompany the table 2 in its movements in the direction of the arrow 13.

For driving the movable table 2, use is made of a prime mover 46 and a spring unit 47 which resets the table after completed advancement.

As has been mentioned above, both of the clamping devices 7 and 8 are designed as elongate beams which, by means of a movement device, are movable in the vertical direction transversely of the plane of extent of the sheets 4 and 5 and the tables 2 and 3. The movement device is preferably designed as a link system and, thus, the clamping device 7 which is intended for cooperation with the table 3 and the sheet 5 is suspended in a downwardly directed portion 15 which is fixed in the frame 1 and which, via journals 18 and 19, serves for the pivotal securement of an upper linkage arm 16 and a lower linkage arm 17. In order to obtain as great a length as possible, and thereby as great a length of movement of the clamping device 7 without the structural dimensions of the apparatus being unnecessarily increased, these linkage arms 16 and 17 extend over or cross the joint 44 between the sheets 4 and 5 and are pivotally secured in the clamping device 7, whereby this is movable transversely of the plane of extent of the sheet 5 substantially vertically. The geometry which has been selected for the linkage arms 16 and 17 entails that the clamping device is suspended in a parallelogram suspension with long linkage arms so that their underside can always be kept parallel with the sheet 5 irrespective of the thickness of the sheet. Corresponding linkage arms are provided at the end of the clamping device 7 facing away from the observer of the Figures.

The clamping device 8 which is intended for cooperation with the table 2 and the sheet 4 is suspended in a carrier 20 which, via a guide 14, preferably a sliding guide, is connected with the frame 1 of the machine. Hereby, the carrier 20 is movable against the action of a spring 21 in a horizontal direction, i.e. substantially parallel with the advancement movements of the table 2. The clamping device 8 is also suspended via a movement device with linkage arms 22 and 23 and journals 24 and 25 in a manner which is wholly identical with the suspension of the clamping device 7.

For operating the two clamping devices 7 and 8 towards and away from the sheets 5 and 4, respectively, drive means 26 and 27 are employed which, in the illustrated embodiment, comprise cylinder units. The cylinder units 26 and 27 are connected via joints 28 and 29 to pressure rods 30 and 31. The pressure rods 30 and 31 are pivotally connected at their upper ends to cranks 32 and 33 which are pivotal in journals 34 and 35.

On activation of the two cylinders 26 and 27, their piston rods are protracted out from the position illustrated in FIGS. 1 and 3, at the same time as the crank arms 32 and 33 are pivoted in a clockwise and counterclockwise direction, respectively. The result will be that the pressure rods 30 and 31 are shifted downwards, which in turn actuates the clamping devices 8 and 7, respectively, in a downward direction towards the sheets 4 and 5, respectively. The depression of the two clamping devices 7 and 8 may be made self-locking if the geometry is adapted in such a manner that the pressure rods and the cranks arms are permitted to pivot so far that their longitudinal directions pass that position where they lie in alignment with one another. If, on the other hand, the geometry is adapted in such a manner that the longitudinal directions of the pressure rods and the crank arms do not fully arrive at that position where they coincide, an extremely great clamping force will be generated against the metal sheets, at the same time as this clamping will be self-adjusting in response to the thickness of the metal sheets.

As has been mentioned above, the heating device 9 is movable in the vertical direction in its sliding guides 10. This achieved in that the prime mover 11 designed in the form of a cylinder unit is connected via a crank arm 35 and a wheel 36 to a second wheel 38 with a crankshaft 39 by the intermediary of a chain or belt drive 37.

Hereby, the heating device 9 will be positively guided under the action of the movement of the prime mover 11. An operating rod 40 is further connected to the crank arm 35 and the wheel 36 and, via a rocker arrangement 41, is mechanically connected to the abutment member or members 6 so that these are movable synchronously with the heating device 9. Thus, the abutments 6 are displaced downwards to the passive position at the same time as the heating device 9 is lowered to the welding position.

The clamping devices 7 and 8 are provided, on their sides facing towards the metal sheets 4 and 5, with engagement means which are disposed to prevent or at least impede relative sliding between the metal sheets and the clamping devices. The engagement means 42 are designed to cooperate, by friction or by direct mechanical engagement, for example via sharp edges 43, barbs, grooves or the like, with the metal sheets in order to improve the grip between the clamping devices 7 and 8 and the metal sheets so that these are reliably brought together in the joint region 44. The engagement means 42 are, as is apparent from FIG. 2, designed as pins which are secured in corresponding bores 45 in the clamping devices 7 and 8. The engagement means 42 are suitably movable in the vertical direction and urged downwards towards the metal sheets by means of springs.

FIG. 2 shows the metal sheets brought together in the joint 44, it being apparent that the abutments 6 are drawn down to lower, passive positions, where they do not prevent the bringing together of the metal sheets. As is intimated by broken lines, the heating device 9 is located immediately above the joint 44 in the welding position.

The present invention may be modified without departing from the spirit and scope of the appended claims.

What is claimed is:

1. An apparatus for the positional fixing of two metal sheets (4, 5) which are to be welded together along a joint (44), comprising a support member (2, 3) provided for each sheet, and clamping means (7, 8) which are urgeable against the metal sheets disposed on the support members, characterized in that there is disposed, in a region where the joint (44) between the sheets (4, 5) is to be located, between closely adjacent edges of the support members (2, 3), an abutment (6) which is movable between an active position where it extends up over the upper sides of the support members (2, 3) to serve as an arrest on insertion of the sheets (4, 5), and a passive position where it is located beneath this level; that the support members are movable in a relative advancement movement towards and away from one another; that the clamping members are provided with movement devices (16, 17; 22, 23) by means of which they are guided in movements towards and away from the support members, substantially transversely directed in relation to their plane of extent; and that the movement devices are, in themselves or in their anchorages (14) in a frame (1) for the apparatus proper, disposed to permit the clamping members to accompany the support members in their relative advancement movements.

2. The apparatus as claimed in claim 1, characterized in that during the relative advancement movement, a first support member (3) and its associated clamping device (7) are stationary, while the second support member (2) and its associated clamping device (8) are displaceable in one direction (13) which is parallel with the plane of extent of the first support member.

3. The apparatus as claimed in claim 1, characterized in that the movement devices for each clamping device (7, 8) at least comprise two mutually substantially parallel linkage arms (16, 17; 22, 23) which are, in the position of the clamping devices urged against the metal sheets, located with their ends fixedly secured in the clamping devices more proximal each respective support member (2, 3) than with their opposite ends.

4. The apparatus as claimed in claim 1, characterized in that the clamping devices (7, 8) are elongated and extend substantially parallel with the joint (44) and at least along the greater part of the length thereof; and that they are provided, on their sides facing towards the metal sheets, with engagement means (42) which are disposed to prevent or impede sliding of the metal sheets (4, 5) in relation to the clamping devices (7, 8) away from the joint (44).

5. The apparatus as claimed in claim 3, characterized in that the linkage arms (16, 17; 22, 23) extend over the joint (44) so that they have their opposing ends located on either side thereof.

6. The apparatus as claimed in claim 1, characterized in that the clamping devices (7, 8) in their positions in engagement with the metal sheets (4, 5) are in spaced apart relationship to one another; and that there is insertable in this space to the joint region (44), a heating device (9) for heating the metal sheets to the welding temperature.

7. The apparatus as claimed in claim 6, characterized in that the heating device (9) is moveably disposed in the vertical direction towards and away from the joint region (44); and that it is of a length to extend throughout the entire length thereof.

8. The apparatus as claimed in claim 6, characterized in that the heating device (9) is, for its driving, interconnected with the abutment (6) so that this is moved to its passive position when the heating device (9) is moved to the joint region (44), and vice versa.

9. The apparatus as claimed in claim 2 characterized in that the movement devices for each clamping device at least comprise two mutually substantially parallel linkage arms which are, in the position of the clamping devices urged against the metal sheets, located with their ends fixedly secured in the clamping devices more proximal each respective support member than with their opposite ends.

10. The apparatus as claimed in claim 2 characterized in that the clamping devices are elongate and extend substantially parallel with the joint and at least along the greater part of the length thereof; and that they are provided, on their sides facing towards the metal sheets, with engagement means which are disposed to prevent or impede sliding of the metal sheets in relation to the clamping devices away from the joint.

11. The apparatus as claimed in claim 3 characterized in that the clamping devices are elongate and extend substantially parallel with the joint and at least along the greater part of the length thereof; and that they are provided, on their sides facing towards the metal sheets, with engagement means which are disposed to prevent or impede sliding of the metal sheets in relation to the clamping devices away from the joint.

12. The apparatus as claimed in claim 4 characterized in that the linkage arms extend over the joint so that they have their opposing ends located on either side thereof.

13. The apparatus as claimed in claim 2 characterized in that the clamping devices in their positions in engagement with the metal sheets are in spaced apart relationship to one another; and that there is insertable in this space to the joint region, a heating device for heating the metal sheets to the welding temperature.

14. The apparatus as claimed in claim 3 characterized in that the clamping devices in their positions in engagement with the metal sheets are in spaced apart relationship to one another; and that there is insertable in this space to the joint region, a heating device for heating the metal sheets to the welding temperature.

15. The apparatus as claimed in claim 4 characterized in that the clamping devices in their positions in engagement with the metal sheets are in spaced apart relationship to one another; and that there is insertable in this space to the joint region, a heating device for heating the metal sheets to the welding temperature.

16. The apparatus as claimed in claim 5 characterized in that the clamping devices in their positions in engagement with the metal sheets are in spaced apart relationship to one another; and that there is insertable in this space to the joint region, a heating device for heating the metal sheets to the welding temperature.

17. The apparatus as claimed in claim 7 characterized in that the heating device is, for its driving, interconnected with the abutment so that this is moved to its passive position when the heating device is moved to the joint region, and vice versa.

18. The apparatus as claimed in claim 17 characterized in that the clamping means comprises two mutually substantially parallel linkage arms having ends fixedly secured in the clamping means and wherein the clamping means are elongated and extend substantially parallel with a greater part of the length of the joint between the sheets, the clamping means comprising engagement means for impeding sliding of metal sheets in relation to the clamping devices and wherein the linkage arms over the joint with opposing ends located on either side of the joint.

\* \* \* \* \*